United States Patent [19]

Olson

[11] Patent Number: 4,657,784

[45] Date of Patent: Apr. 14, 1987

[54] PROCESS FOR ENCAPSULATING PARTICLES WITH AT LEAST TWO COATING LAYERS HAVING DIFFERENT MELTING POINTS

[75] Inventor: Keith E. Olson, Apple Valley, Minn.

[73] Assignee: Ecolab Inc., St. Paul, Minn.

[21] Appl. No.: 838,276

[22] Filed: Mar. 10, 1986

[51] Int. Cl.$^4$ .......................... B05D 1/02; B05D 1/36; B05D 3/02; C11D 11/00

[52] U.S. Cl. ...................................... 427/213; 252/91; 252/99; 252/174; 252/174.13; 252/186.25; 252/186.35; 252/186.36; 252/186.37; 427/214; 427/220; 427/372.2; 427/374.1; 427/374.2; 427/374.3; 427/374.4; 427/375; 427/384; 428/403

[58] Field of Search .............. 252/91, 99, 174, 174.13, 252/186.25, 186.35, 186.36, 186.37; 427/213, 214, 220, 372.2, 374.1, 374.2, 374.3, 374.4, 375, 384

[56] References Cited

U.S. PATENT DOCUMENTS

| | | | |
|---|---|---|---|
| 3,112,274 | 11/1963 | Morgenthaler et al. | 252/99 |
| 3,154,494 | 10/1964 | Speak et al. | 252/96 |
| 3,650,961 | 3/1972 | Hudson | 252/99 |
| 3,703,470 | 11/1972 | Brennan | 252/99 |
| 3,908,045 | 9/1975 | Alterman | 427/213 |
| 3,925,234 | 12/1975 | Hachmann | 252/186 |
| 3,962,106 | 6/1976 | Rubin et al. | 252/99 |
| 3,967,039 | 6/1976 | Ninane | 428/403 |
| 4,048,351 | 9/1977 | Saeman | 427/213 |
| 4,078,099 | 3/1978 | Mazzola | 427/213 |
| 4,136,052 | 1/1979 | Mazzola | 252/94 |
| 4,327,151 | 4/1982 | Mazzola | 428/407 |
| 4,421,669 | 12/1983 | Brichard | 252/186.25 |
| 4,444,674 | 4/1984 | Gray | 252/95 |
| 4,526,699 | 7/1985 | Jones | 252/99 |

Primary Examiner—Dennis L. Albrecht
Attorney, Agent, or Firm—Merchant, Gould, Smith, Edell, Welter & Schmidt

[57] ABSTRACT

High efficiency encapsulation of core particles, particularly halogen bleaches, by (i) encapsulating the core particle in at least two separate coats wherein the melting point of the inner or first coating material is below the melting point of the outer or second coating material, (ii) heating the thus encapsulated particle to a temperature between the melting points of the inner and outer coating materials in order to liquefy the inner coat, and (iii) allowing the liquid inner coat to solidify and form a continuous, nonporous encapsulating coating.

23 Claims, 2 Drawing Figures

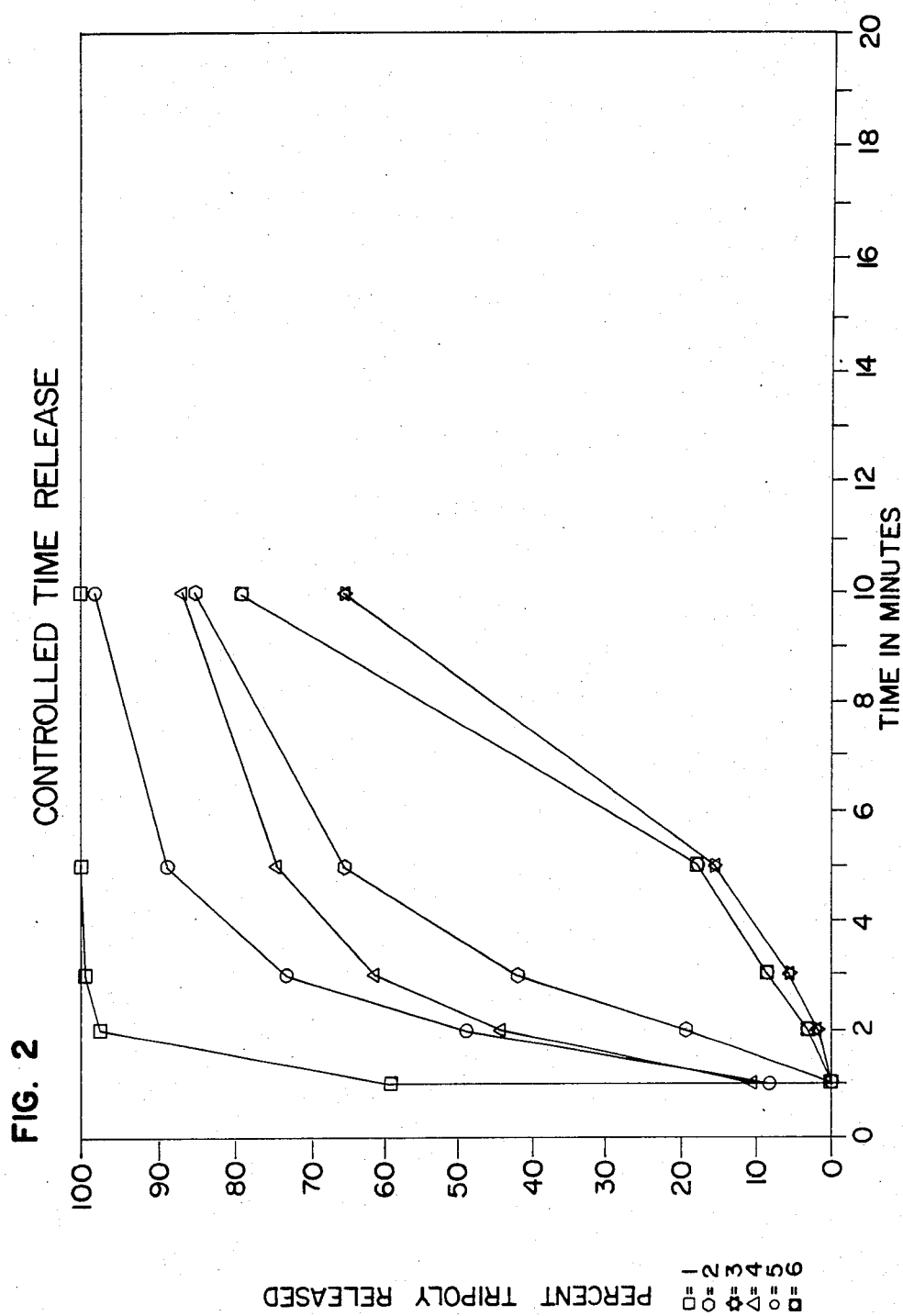

PROCESS FOR ENCAPSULATING PARTICLES WITH AT LEAST TWO COATING LAYERS HAVING DIFFERENT MELTING POINTS

FIELD OF THE INVENTION

The invention broadly relates to the coating or encapsulating of discrete particulate matter with protective layers. More particularly, this invention relates to the encapsulation of solid bleach particles for use in a detergent composition to protect the bleach from interaction with reactive compositions found in the detergent.

BACKGROUND OF THE INVENTION

Encapsulation as used herein is a process in which a small, discrete unit of particulate matter, commonly referred to as the core, is coated with one or more layers of a coating material in order to prevent premature contact of the core with the surrounding environment. The coating or coatings isolate the core particle for later release under controlled conditions.

Nearly any substance capable of being formed into discrete particles may be encapsulated. Core matrials may consist of single substances or mixtures of several substances; and may be solid, liquid, or gaseous in nature. Core materials are typically those substances or mixtures which, if utilized unencapsulated would be utilized or deactivated before performing an intended function. The following list typifies general classes of materials which have been encapsulated:

| | | |
|---|---|---|
| adhesives | bacteria | blowing agents |
| catalysts | curing agents | detergents |
| drugs | dyes | flavors |
| foods | fuels | inks |
| insecticides | leavening agents | metals |
| monomers | coils | paints |
| perfumes | photographic agents | pigments |
| plasticizers | propellants | solvents |
| stabilizers | viruses | vitamins. |

A wide variety of coating materials have been used to encapsulate core particles. The most commonly used coating materials are natural or synthetic polymers, including, for example, gelatin, ethyl cellulose, or poly(methylmethacrylate). Typical coating materials include:

| | | |
|---|---|---|
| gelatin | gum | arabic |
| starches | sugars | ethyl cellulose |
| carboxymethyl | shellac | rosin |
| cellulose | paraffin | tristearin |
| polyethers | polyethylene | polypropylene |
| polybutadiene | polystyrene | polyacrylamides |
| epoxies | polyesters | polyamides |
| aluminum | polyisoprene | silicones |
| copper | polyurethanes | silicates |
| | | silver. |

A great deal of attention has been directed to coating compositions used in blended cleaning agents in order to protect each component from the harmful degradation effect of other components. Typically bleaching agents can react with organic cleaning agents during manufacture and storage. Such reactions can reduce the active concentration of both bleach and cleaning agent. In the formulation of detergents it is also difficult to maintain an effective concentration of bleach in the detergent composition. Typical bleach compositions are relatively unstable in the presence of alkaline compounds and free moisture. Known coating compositions simply do not segregate reactive compositions to prevent significant loss of bleaching and cleaning activity.

The numerous materials which are used as ingredients in detergent formulations may be divided into the following groups: (a) surfactants; the major cleansing constituent of detergents; (b) diluents or fillers; inorganic salts, acids, and bases which do not contribute to detergency; (c) builders; additives which enhance the detergency, foaming power, emulsifying power, or soil suspending effect of the composition; and (d) special purpose additives such as (i) bleaching agents, (ii) brightening agents, (iii) bacteriocides, and (iv) emollients.

Many attempts have been made to manufacture a detergent composition containing a stable bleaching component including encapsulation of the bleach. Many different encapsulation methods and coating materials have been used in an attempt to obtain a low cost, efficiently encapsulated bleach. Examples of such attempts are disclosed in Brubacher, U.S. Pat. No. 4,279,764, (chemical encapsulation of a chlorine bleaching agent with a silicate bound, hydrated, soluble salt containing an N-H chlorine accepting component); Hudson, U.S. Pat. No. 3,650,961 (fluidized bed enacapsulation of chloroisocyanurate with an inorganic salt); and Alterman, U.S. Pat. Nos. 3,908,044 and 3,908,045, (double coat fluidized bed encapsulation of a chlorine releasing agent with a first coat of a fatty acid having 12 to 22 carbon atoms and a second coat of a fixed alkali hydroxide).

Current emphasis in the encapsulation art is directed to the encapsulation efficiency of the process. Encapsulation efficiency is typically determined by measuring the percentage of core material released into solution after a specified time period when placed in a dissolving environment. Several of the attempted encapsulation processes have been able to increase the encapsulation efficiency above that typically achieved but reach such results at great expense and/or through a difficult process.

It is a commonly held belief that the low encapsulation efficiency is due in major part to a failure to (i) completely coat the core particle, (ii) uniformly coat, and/or (iii) prevent the development of cracks, pores or fissures in the coating.

One of the major difficulties encountered in achieving inexpensive high encapsulation efficiency is that the coating must be applied in "molten form". Ideally, the coating should be added as a flowable liquid to allow it to flow around the core, sealing the core without gaps and/or cracks. However, if added as a flowable liquid, the coating can often fail to adhere to the core and can leave an insufficiently coated core.

The process temperature at which the coating agent is added has been found to be critical. If the temperature is too low the coating can contain numerous fissures or cracks that can be due to poor wetting of the surface of the core or inability of the coating to adhere to the core and if too high (above the melting point of the coating agent) the coating may cause agglomeration of the particles or cause a complete collapse of the fluidized particles. Encapsulation efficiency is improved when the process temperature is held just below the melting point of the coating agent. Such critical process temperatures result in long batch cycle times and the need for critical temperature control.

In an attempt to achieve the desired viscosity, coating compounds are often mixed with a volatile solvent. While this often increases the coating efficiency, the use of volatile solvents is dangerous as (i) many solvents are flammable and explosive, and (ii) many solvents are toxic if inhaled. In addition the use of solvents is expensive as (i) the costly solvent is typically used in large quantities and must be recovered and (ii) expensive "explosion proof" equipment must be used such as static electricity control systems, explosion vents, reinforced equipment, solvent recovery systems and the like.

Accordingly, a substantial need exists for a simple, inexpensive solventless encapsulation process which works with a wide combination of core and coating compounds and results in a highly efficient encapsulation product.

SUMMARY OF THE INVENTION

I have discovered that high efficiency encapsulation of a diverse range of core materials can be achieved using a diverse range of coating substances by (i) surrounding the core material with an encapsulation layer comprising at least two separate coatings having different melting temperatures, a first inner coating and a second or outer coating, and (ii) heat treating the coatings to a temperature above the melting temperature of the first or inner coating but below the melting temperature of the second or outer coating and the core material for a sufficient duration to liquefy the first or inner coating material. Upon melting the first coating (i) wets the core and the second coating and (ii) uniformly flows within the space formed between the core and the second coating. Upon cooling the uniform liquefied first coating solidifies and forms a substantially continuous, smooth, nonporous, even coating of the core particle. The second or outer coat is used to retain the liquefied first coat in place and prevent agglomeration of the particles during the heat treating process.

I have found that this process works particularly well in a fluidized bed and is particularly useful for encapsulating bleaches to be used in detergent compositions. Encapsulation of the bleach allows it to be added to the detergent composition without significant loss of its bleaching activity during manufacture and storage of the detergent as the bleach is isolated from incompatible or reactive detergent components. Therefor, this invention will be further discussed with respect to the encapsulation of a halogen bleach in a fluidized bed, but is not intended to be unduly limited thereto.

The number of paired coatings applied and heat treated according to this process is potentially infinite. For example; a core compound may be coated sequentially with coatings A, B, C, and D wherein the melting point of the coatings are, from lowest to highest, A, C, B and D. After all four coatings are applied and solidify the temperature of the quadruply coated capsule is increased to above the melting points of coatings A and C but below the melting points of coatings B and D. Coatings A and C will liquefy and form substantially continuous, smooth nonporous even coats while coatings B and D will remain solid and retain liquefied coatings A and C in place.

For purposes of this application, "fluidization temperature" is the range of temperatures within which a liquid coating sprayed onto fluidized particles will adhere to and substantially surround the particles without substantial agglomeration. The fluidization temperature is dependent upon, among other factors, the core material being coated and the coating material used.

BRIEF DESCRIPTION OF THE DRAWINGS

FIG. 2 is a graphical depiction of the rate of release of core material for variously coated and treated encapsulates.

DETAILED DESCRIPTION OF THE PREFERRED EMBODIMENT

Figure 1:
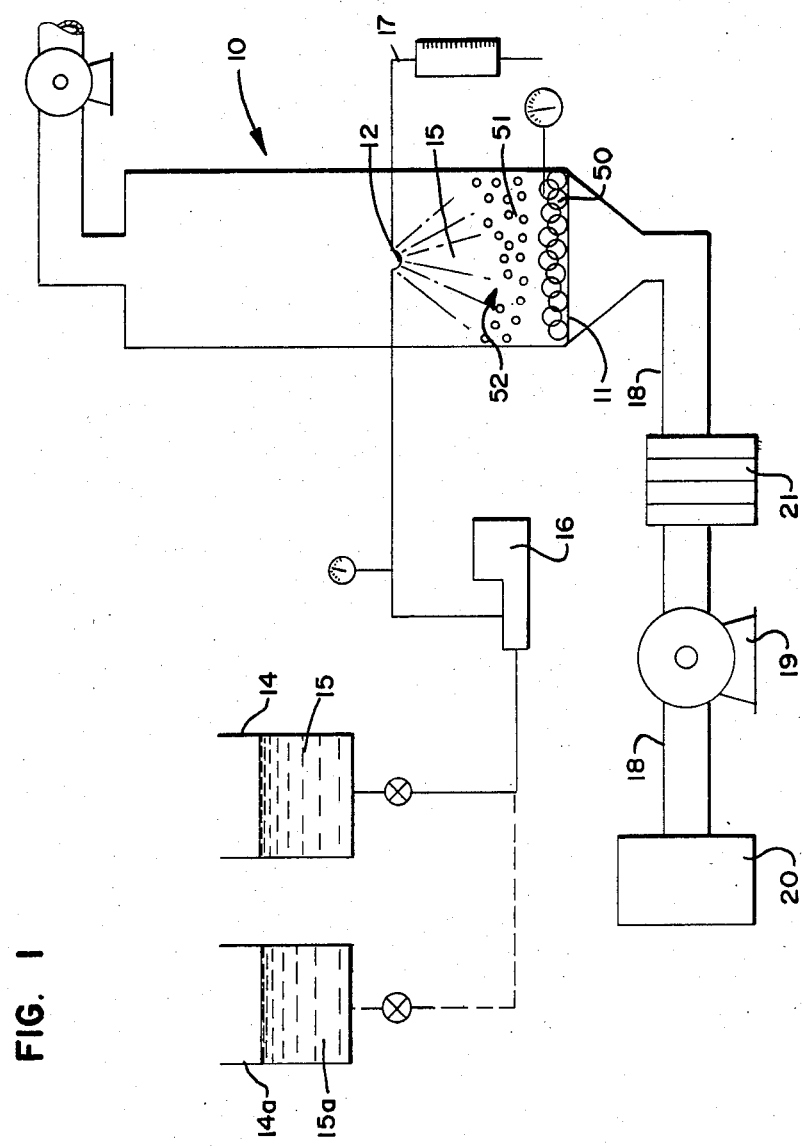
FIG. 1 is a schematic diagram of a fluidized bed apparatus utilized to encapsulate a core material in accordance with the process of the invention.

I have found that highly efficient encapsulated capsule (i.e. 90 to 99%) of a diverse variety of core materials using a diverse variety of coating materials can be easily and inexpensively obtained. The capsule is formed by encapsulation of the core particle with at least two coating layers which is subsequently heat treated so that at least one inner coat liquefies to form a substantially continuous, smooth, nonporous and even coating upon cooling.

Core Materials

Nearly any substance or mixture of substances may be encapsulated so long as individual particles of the substance can be maintained in a discrete individual non-agglomerated state during the coating process. Fluidized beds (the preferred coating apparatus) are generally restricted to solid core materials. Therefore, the encapsulation process will be described with respect to a solid core material without intending to be unduly limited thereby. Of particular interest is the encapsulation of a solid halogen bleach (particularly chlorine releasing bleaches) for use in a detergent composition.

Among the chlorine-releasing substances suitable as a core material are potassium dichloroisocyanurate, sodium dichloroisocyanurate, chlorinated trisodium phosphate, calcium hypochlorite, lithium hypochlorite, [(mono-trichloro)-tetra-(mono-potassium dichloro)]-penta-isocyanurate, 1,3-dichloro-5,5-dimethylhydantoin, paratoluene sulfondichloro-amide, N-chlorammeline, N-chlorosuccinimide, N,N'-dichloroazodicarbonamide, chlorinated dicyandiamide, trichlorocyanuric acid, monotrichloro-tetra(monopotassium dichloro-s-triazine trione), trichloro-s-triazine trione. For reasons of superior performance, the preferred chlorine releasing core material is sodium dichloroisocyanurate dihydrate, which is commercially available from the Olin Corporation under the tradename CLEARON CDB-56.

For purposes of ease of handling and formulation the particle size of the core is preferably about 10 to 60 U.S. mesh.

Inner (Heat Treated) Coating Materials

Nearly any substance may be employed as the inner coating so long as it is a solid at normal storage temperatures typically between 30° and 100° F. (−1° to 38° C.) and a melting point that is within temperatures attainable in coating units, typically 100° to 200° F. (40° to 94° C.). The inner coating material is preferably inert with respect to the core material. If the inner coating material is potentially reactive with the core material, the core material may be initially coated with an inert material to prevent or retard any reaction between the core and the inner coat, the initial coat acting as a chemical barrier between the core and the other layers. This intitial coating should have a melt temperature above the heat treatment temperature to be applied to the final encapsulated product so that the initial coating does not liquefy and blend with the inner coat during the heat treatment step. A useful initial coating compound for a halogen bleach core material to be used in a detergent composition would be an admixture of sodium sulfate and sodium tripolyphosphate having a melting point of about 1100° F. to about 1600° F., at which temperature they tend to decompose. Sodium sulfate and sodium tripolyphosphate are relatively inert with respect to halogen bleaches, have a very high melting point, and are components commonly blended into detergent compositions.

The inner coating material is preferably a substantially water insoluble material in order to prevent the passage of deactivating moisture to the bleach core and if water insoluble preferably has a melting point below the bath temperature in which the encapsulate is used to aid in release of the core compound once added to the bath. A nonexhaustive list of substantially water insoluble materials which may be utilized as the inner coating material include $C_{12}$ to $C_{20}$ fatty acids such as sodium sulfate hydrate, stearic acid, palmitic acid, and n-alkanoic acids; paraffin waxes; microcrystalline waxes; $C_{12}$ and greater primary and secondary solid alcohols; pluronic surfactants with molecular weight between about 8,000 to about 16,500; primary and seconary alkyl sulfates; and alkali metal sulfonates. A useful inner coating material for a halogen bleach core material is an admixture of a (i) $C_{16}$ to $C_{20}$ fatty acids and (ii) microcrystalline wax; the admixture having a melting point of about 110° F. to 140° F.

Outer Coating Materials

Nearly any substance may be employed as the outer coating material so long as it is solid at normal storage temperatures (typically between 30° and 100° F.). However, the melting point of the outer coating material must be greater than the melting point of the inner coating material underneath. Therefore, the choice of materials available for use as the outer coat material depends upon the inner coating material used. A nonexhaustive list of compounds which may be used as the second coat includes alkalies such as sodium carbonate, sodium bicarbonate, sodium sequicarbonate, sodium borate, potassium bicarbonate, potassium sequicarbonate, potassium borate, phosphates such as diammonium phosphates, monocalcium phosphate, tricalcium phosphate, calcium pyrophosphate, iron pyrophosphate, magnesium phosphate, monopotassium orthophosphate, potassium pyrophosphate, disodium orthophosphate, trisodium orthophosphate, tetrasodium pyrophosphate, sodium tripolyphosphate, sodium phosphate glass; neutral salts such as zeolites, sodium sulfate, sodium chloride, and talc; silicates and silicate hydrates such as sodium metasilicate, sodium sequisilicate, dry sodium/potassium silicate water glasses, sodium orthosilicate; organic sequestering agents such as copolymers of vinylacetate and maleic anhydride, copolymers of acrylic acid and maleic anhydride, copolymers of maleic anhydride and itaconic acid, polyacrylic acid; and N-alkyl sulfonates; such as octyl sulfonate, sodium carboxymethylcelluloses, hydropropylcellulose, hydroxyethyl ether of cellulose, hydroxypropyl methylcellulose and known stable hydrates of these compounds. A useful outer coat material for a halogen bleach core when the encapsulate is to be used in a detergent composition is an admixture of anhydrous sodium sulfate and sodium tripolyphosphate, the admixture having a melting point of about 1100° F. to about 1600° F., at which temperature they tend to decompose, as sodium sulfate and sodium tripolyphosphate are fillers commonly used in detergent compositions.

Fluidized Bed Apparatus

When carrying out the process of my invention, encapsulation is conveniently done utilizing the apparatus shown schematically in FIG. 1. Referring to FIG. 1, a coating chamber or cylindrical or conical tower 10 is shown, wherein the coating or encapsulation of the core particles is accomplished. At the base of chamber 10 is distributor plate 11. A supply of core particles 50 is placed within chamber 10, supported by distributor plate 11. A downwardly projecting nozzle 12 constituting a spraying means is adjustably disposed within chamber 10, position within chamber 10 so that liquid droplets of a coating material 15, discharged in a downwardly diverging three-dimensional spray pattern through nozzle 12, will just cover the upper surface area 52 of an expanded fluidized bed 51 of the core particles 50. The nozzle 12 may also be positioned to spray upward onto the fluidized particles 50.

Coating solution 15 is contained in a vessel 14 and fed to nozzle 12 by a pump 16. The spraying of coating solution 15 through nozzle 12 may be aided by pressurized air entering nozzle 12 at inlet 17.

A fluidizing gas flow created by blower 19 (i) passes through duct 18 and (ii) passes through perforations in distributor plate 11. Before passing through distributor plate 11 the gas is either cooled by cooling system 20, or heated by heat exchanger 21 to maintain the fluidizing gas within the required fluidization temperature range.

In use, a known weight of a multiplicity of core particles 50 is placed on distributor plate 11. Air is caused to flow through duct 18 and upwardly through distributor plate 11 by blower 19, expanding or fluidizing the layer of core particles, and thereby maintaining the particles in continuous motion within the volume 51 defined by the fluidized bed. A solidifiable liquid coating substance 15, contained in vessel 14, is pumped by means of pump 16 to nozzle 12 wherein the coating 15 is sprayed onto the upper surface area 52 of the fluidized bed 51 until all particles 50 in the bed 51 are completely coated. Particles coated by the above-described procedure are encapsulated with a relatively continuous coating, substantially free-flowing and generally nonagglomerated.

Subsequent coats are added sequentially in like fashion, allowing sufficient time between coatings to allow the previous coat to solidify and/or dry.

Multiple coatings may be applied in a single fluidized bed 10 by either (i) applying a first coat, emptying coating solution tank 14, filling tank 14 with the second coating solution and applying the second coat; or (ii) utilizing separate solution tanks 14 and 14a for each coating solution 15 and 15a, each tank in fluid communication with spray nozzle 12.

Multiple coatings may also be applied utilizing separate fluidized beds for each coat.

Generally, the capsules having a core of an active halogen bleach, an inner coat and an outer coat will comprise about 30 to 95 wt-% core, about 2 to 40 wt-% inner coating material and about 2 to 30 wt-% outer coating material, and the capsules having a core of an active halogen bleach, an initial coat, an inner coat and an outer coat will comprise about 30 to 95 wt-% core, about 1 to 20 wt-% initial coating material, about 2 to 40 wt-% inner coating material, and about 2 to 30 wt-% outer coating material.

EXAMPLE I

Encapsulation Process

All percentages and ratios utilized in this Example are based upon weight-% unless otherwise specified.

Core Material

About 25.82 lbs. of granular dichloroisocyanurate dihydrate (a halogen bleach) obtained from the Olin Corporation under the trade name CLEARON CDB-56, having particle sizes of about 10 to 60 U.S. mesh were placed on a fluidized bed distributor plate substantially as depicted in FIG. 1. The particles were fluidized by an upwardly moving air stream forming a fluidized bed of about 6 to 12 inches high. The temperature of the fluidized bed was maintained at about 110° to 130° F. (i.e. the fluidization temperature of the initial coating material to be applied).

Initial Coating Material

The initial coating solution was prepared by dissolving 1 part of an admixture of about 75% sodium sulfate and about 25% sodium tripolyphosphate in 3 parts soft water. The initial coating solution was sprayed onto the fluidized dichloroisocyanurate dihydrate particles until all particles were completely coated. The ratio of core to initial coating (before evaporation) was approximately 3 to 1.

The initially coated capsules were heated to about 180° F. and maintained in a fluidized state until about 98% of the water contained in the initial coating material evaporated.

Inner Coating Material

The inner coat material was prepared by melting an admixture of 85% EMERSOL TM 153 (stearic acid) sold by Emery Industries, and 15% WITCO Multiwax 110-X (a microcrystalline wax) sold by Witco Chemical Corporation. The admixture was melted by heating to about 150° F. to 200° F. The fluidized bed temperature was reduced to about 95° F. and the inner coating material sprayed onto the initially coated particles. The inner coat was sprayed upon the particles until all particles were completely coated and then the inner coat was allowed to solidify. The ratio of core (without initial coating) to inner coating was approximately 3 to 1.

Outer Coating Material

The outer coat material was prepared by dissolving 1 part of an admixture of about 75% sodium sulfate and about 25% sodium tripolyphosphate in about 3 parts soft water. The outer coat was sprayed onto the capsules and dried in the same manner as previously described with respect to the initial coating. However, during this step the temperature of the fluidized bed was not allowed to exceed the melting point of the inner coating material (about 140° F.), otherwise the inner coat would have liquefied and failed to encapsulate the core particles. Therefore, the temperature of the fluidized bed was maintained at about 120° F. during application of the outer coat.

The ratio of core (without initial and inner coatings) to outer coating (before evaporation) was approximately 2 to 1.

Heat Treatment

After addition and solidification of the outer coat, the fluidized bed temperature was increased to about 140° to 150° F. (above the melting point of the inner coat but below the melting point of the initial and outer coats). This liquefied the inner coat material while allowing the core, initial coat and outer coat materials to remain in a solid state. When liquefied the inner coat flowed freely around the core material, eliminating any cracks, pores and/or gaps in the coating and thereby increasing the encapsulation efficiency. The liquefield inner coat was held in place around the core particle by the solid outer core.

The final encapsulated product was then cooled to less than about 110° F. and removed from the fluidization chamber.

The final dried encapsulated product had approximately the following composition based upon the assumption that during formulation of the encapsulate the core particle of sodium dichloroisocyanurate dihydrate loses one molecule of hydrated water:

TABLE I

| Layer | Materials | Wt-% Based Upon Final Encapsulate |
|---|---|---|
| Core | Sodium dichloroisocyanurate (monohydrate) | 59.96 |
| Initial Coating | Sodium sulfate | 3.57 |
| | Sodium tripolyphosphate | 1.20 |
| | Soft water | 0.27 |
| Inner Coating | Stearic acid (EMERSOL TM 153) | 16.79 |
| | Paraffin wax (WITCO 110X) | 3.20 |
| Outer Coating | Sodium sulfate | 10.67 |
| | Sodium tripolyphosphate | 3.57 |
| | Soft water | 0.77 |
| | | 100.00 |

The thus encapsulated bleach may be released into the wash water slowly by allowing the coatings to dissolve and/or the bleach to leach through the coatings, or quickly by melting or crushing the coatings.

EXAMPLE II

Release Rates

Five samples of single and double coat encapsulated tripolyphosphate (which is not a bleach but was used as a model core compound since analysis for phosphate is easy and accurate) particles were made in general accordance with the procedure disclosed in Example I. Tripolyphosphate was used as the core material to facilitate measurement of release of the core material. The coating materials, number of coatings, wt-% of coatings and whether or not the capsule was heat treated in accordance with my invention is indicated in Table II.

TABLE II

| Identifier | Percent Core Material in Final Encapsulate | Percent Inner Coating Material in Final Encapsulate | Inner Coating Material | Percent Outer Coating Material in Final Encapsulate | Outer Coating Material | Heat Treated (Yes/No) |
|---|---|---|---|---|---|---|
| 1 | 100 | 0 | — | 0 | | No |

TABLE II-continued

| Identifier | Percent Core Material in Final Encapsulate | Percent Inner Coating Material in Final Encapsulate | Inner Coating Material | Percent Outer Coating Material in Final Encapsulate | Outer Coating Material | Heat Treated (Yes/No) |
|---|---|---|---|---|---|---|
| 2 | 90 | 10 | a | 0 | | No |
| 3 | 81 | 9 | a | 10 | Sodium sulfate | Yes |
| 4 | 90 | 10 | b | 0 | | No |
| 5 | 81 | 9 | b | 10 | Sodium sulfate | No |
| 6 | 81 | 9 | b | 10 | Sodium sulfate | Yes | a = 1-octadecanol (stearyl alcohol)
b = Fatty acid EMERSOL 153 (stearic acid)

TABLE III

| Percent Core Released at: | Identifier | | | | | |
|---|---|---|---|---|---|---|
| | 1 | 2 | 3 | 4 | 5 | 6 |
| 1 Minute | 58.79 | 0.37 | 0.00 | 10.41 | 8.07 | 0.00 |
| 2 Minutes | 97.89 | 18.83 | 2.10 | 44.19 | 48.79 | 2.96 |
| 3 Minutes | 99.57 | 41.56 | 5.20 | 61.31 | 72.98 | 8.72 |
| 5 Minutes | 100.00 | 65.40 | 14.76 | 74.37 | 88.42 | 17.50 |
| 10 Minutes | 100.00 | 84.66 | 64.68 | 86.48 | 98.32 | 78.86 |

Release rates of the five samples and a sixth sample of unencapsulated tripolyphosphate, as a reference, were determined by placing a portion of the sample in one liter water heated to 74° F. and mixed with a blade mixer set at a constant speed of 460 r.p.m. The size of the sample portion was chosen so that approximately 200 parts per million phosphate from the core material would be present in the water when the core was completely dissolved. Timing began when the sample was added to the water. An Instrumentation Laboratory Auto Sampler MODEL 254-PLASMA 100 spectrometer was used to monitor the release of phosphate into solution. This testing device continually extracted approximately 1 milliliter of the water per minute and tested the concentration of tripolyphosphate therein. The results are tabulated in Table III and graphically shown in FIG. 2.

As can readily be seen from FIG. 2, the encapsulation process of my invention represented by samples 3 and 6 significantly decreases the release rate of the core material compared to encapsulation without use of the heat treating step, indicating an increase in coating efficiency.

The specification and Examples are presented to aid in the complete nonlimiting understanding of the invention. Since many variations and embodiments of the invention can be made without departing from the spirit and scope of the invention, the invention resides in the claims hereinafter appended.

I claim:

1. A process for encapsulating a reactive core particle to protect the particle from degradative interaction when contacted with reactive compounds by improving coating encapsulation efficiency, which comprises:
   (a) contacting the core particle with a sufficient amount of a first coating material to form a single coating on the core particle;
   (b) contacting the single coating with a second coating material, wherein the second coating material has a melting point higher than the melting point of the first coating material, to form a coated particle having at lesat two layers of coating;
   (c) heating the coated particle to a temperature above the melting point of the first coating material but below the melting point of the second coating material to form a liquid first coating layer; and
   (d) solidifying the liquid first coating layer.

2. The process of claim 1 wherein the particle has a particle size of about 10 to 60 U.S. mesh.

3. The process of claim 2 wherein the core particle comprises a source of active halogen bleach.

4. The process of claim 1 wherein the first coating material comprises a substantially water insoluble compound.

5. The process of claim 4 wherein the first coating material is selected from the group consisting of $C_{12\text{-}20}$ fatty acids, microcrystalline waxes, $C_{12\text{-}20}$ alcohols, and mixtures thereof.

6. The process of claim 5 wherein the second coating material is selected from the group consisting of alkali metal sulfates, alkali metal phosphates and mixtures thereof.

7. The process of claim 3 further comprising an initial step of coating the particles with an initial coating material having a melting point higher than the temperature attained during the heating step (c) to prevent chemical interaction between the particle and the first coating material.

8. The process of claim 7 wherein the initial coating material is selected from the group consisting of alkali metal sulfates, alkali metal phosphates and mixtures thereof.

9. The process of claim 3 wherein the coated particle having at least two layers of coating comprises:
   (a) about 30 to 95 wt-% active halogen bleach particle;
   (b) about 2 to 40 wt-% first coating material; and
   (c) about 2 to 30 wt-% second coating material.

10. The process of claim 7 wherein the coated particles comprise:
   (a) about 30 to 95 wt-% active halogen bleach particle;
   (b) about 1 to 20 wt-% initial coating material;
   (c) about 2 to 40 wt-% first coating material; and
   (d) about 2 to 30 wt-% second coating material.

11. The process of claim 7 wherein at least one of the coatings is contacted in an aqueous solution and dried before contacting a subsequent coating.

12. A process for encapsulating a reactive core particle in a fluidized bed to protect the particle from degradative interaction when contacted with reactive compounds by improving encapsulation efficiency, which comprises:
   (a) fluidizing a plurality of the particles in a fluidized bed;
   (b) contacting the particles with a normally solid coating material, at an effective temperature to form a molten liquid coat, to form particles with a first coat;
   (c) contacting the particles having a first coat with a normally solid second coating material, at an effective temperature to form a molten liquid coat, to form particles with at least a first coat and a second coat; the second coating material having a melting point higher than the first coating material;

(d) heating the particles having at least a first coat and a second coat to a temperature above the melting point of the first coating material but below the melting point of the second coating material, to form a generally spherical liquid layer between the core and the second coat; and (e) solidifying the spherical liquid layer.

13. The process of claim 12 wherein the particle has a particle size of about 10 to 60 U.S. mesh.

14. The process of claim 13 wherein the core particle comprises a source of active halogen bleach.

15. The process of claim 12 wherein the first coating material comprises a substantially water insoluble compound.

16. The process of claim 15 wherein the first coating material is selected from the group consisting of $C_{12-20}$ fatty acids, microcrystalline waxes, $C_{12-20}$ alcohols and mixtures thereof.

17. The process of claim 16 wherein the outer coating material is selected from the group consisting of alkali metal sulfates, alkali metal phosphates and mixtures thereof.

18. The process of claim 12 wherein the particles are contacted, prior to the first coating material, with an initial coating material having a melting point higher than the temperature attained during the heating step (e) to prevent chemical interaction between the particles and the first coating material.

19. The process of claim 18 wherein the initial coating material is selected from the group consisting of an alkali metal sulfate, an alkali metal phosphate and mixtures thereof.

20. The process of claim 14 wherein the coated particles having at least a first coat and a second coat comprise:
(a) about 30 to 95 wt-% active halogen bleach particles;
(b) about 2 to 40 wt-% first coating material; and
(c) about 2 to 30 wt-% second coating material.

21. The process of claim 18 wherein the coated particles comprise:
(a) about 30 to 95 wt-% active halogen bleach particle;
(b) about 1 to 20 wt-% initial coating material;
(c) about 2 to 40 wt-% first coating material; and
(d) about 2 to 30 wt-% second coating material.

22. The process of claim 12 wherein at least one of the coatings is contacted in an aqueous solution and dried before contacting a subsequent coating.

23. A process for encapsulating particles in a fluidized bed comprising:
(a) fluidizing about 10 to 60 U.S. mesh solid active halogen bleach particles in a fluidized bed;
(b) adjusting the temperature of the fluidized bed to the fluidization temperature of an initial coating material;
(c) contacting the particles with a slurry or solution of a normally solid initial coating material until substantially all particles are coated with the initial coating material to form particles having an initial coating, the initial coating material selected from the group consisting of alkali metal sulfates, alkali metal phosphates and mixtures thereof;
(d) solidifying the initial coating;
(e) spraying the particles having an initial coating with a slurry or solution of a normally solid first coating material until substantially all the particles having an initial coating are coated with the first coating material to form particles having an initial coating and a first coating, the inner coating material selected from the group consisting of 12–20 carbon fatty acids, microcrystalline waxes, 12–20 carbon alcohols, and mixtures thereof;
(f) solidifying the inner coating;
(g) spraying the particles having an initial coating and a first coating with a slurry or solution of a normally solid second coating material until substantially all the particles having an initial coating and a first coating are coated with the second coating material to form heat treatable particles, the second coating material having a melting point above the melting point of the first coating material and selected from the group consisting of alkali metal sulfates, alkali metal phosphates, and mixtures thereof;
(h) solidifying the outer coating;
(i) heating the heat treatable particles to a temperature between the melting points of the first and the second coating materials to form the first coating material into a liquid layer; and
(j) solidifying the liquid layer to form a solid seal; whereby a heat treated halogen bleach encapsulate is formed comprising:
(i) about 30 to 95 wt-% active halogen bleach core;
(ii) about 1 to 20 wt-% initial coating material;
(iii) about 2 to 40 wt-% first coating material; and
(iv) about 2 to 30 wt-% second coating material.

* * * * *